(12) United States Patent
Baughman

(10) Patent No.: US 12,410,051 B2
(45) Date of Patent: Sep. 9, 2025

(54) TWO PIECE, T-SHAPED DISPENSING TAP AND METHOD OF MAKING SAME

(71) Applicant: RIEKE LLC, Auburn, IN (US)

(72) Inventor: Gary Baughman, Clear Lake, IN (US)

(73) Assignee: RIEKE LLC, Auburn, IN (US)

( * ) Notice: Subject to any disclaimer, the term of this patent is extended or adjusted under 35 U.S.C. 154(b) by 134 days.

(21) Appl. No.: 18/265,015

(22) PCT Filed: Dec. 7, 2021

(86) PCT No.: PCT/US2021/062129
§ 371 (c)(1),
(2) Date: Jun. 2, 2023

(87) PCT Pub. No.: WO2022/125498
PCT Pub. Date: Jun. 16, 2022

(65) Prior Publication Data
US 2024/0002214 A1    Jan. 4, 2024

Related U.S. Application Data

(60) Provisional application No. 63/122,182, filed on Dec. 7, 2020.

(51) Int. Cl.
*B67D 3/04*  (2006.01)
*F16K 31/528*  (2006.01)

(52) U.S. Cl.
CPC .............. *B67D 3/045* (2013.01); *B67D 3/047* (2013.01); *F16K 31/5286* (2013.01)

(58) Field of Classification Search
CPC ......... B65D 77/067; F16K 3/246; F16K 3/28; F16K 35/04; B67D 3/043; B67D 3/045; B67D 3/047
(Continued)

(56) References Cited

U.S. PATENT DOCUMENTS 1,339,665 A * 5/1920 Otto ................... F16K 3/246
                                                         251/210
2,217,835 A * 10/1940 Corbin, Jr. ............. F16K 3/246
                                                         137/630.22
(Continued)

FOREIGN PATENT DOCUMENTS

EP    0115164 A1    8/1984
EP    0272906 A2    6/1988
(Continued)

OTHER PUBLICATIONS

Patent Cooperation Treaty (PCT), International Search Report and Written Opinion for Application PCT/US2021/062129 filed Dec. 7, 2021 mailed Feb. 25, 2022, International Searching Authority, US.
(Continued)

*Primary Examiner* — Charles P. Cheyney
(74) *Attorney, Agent, or Firm* — McDonald Hopkins LLC

(57) ABSTRACT

A two piece, molded tap is contemplated. The tap is includes a T-shaped body with a rotatable cap serving as a valve element. Camming means are provided on opposing but concealed faces of the cap to enable the smooth and easy rotation of the cap between open and closed positions while rotating the cap less than one full revolution in comparison to the body which remains fixed to a flexible pouch or container.

13 Claims, 10 Drawing Sheets

(58) Field of Classification Search
USPC .......................................................... 222/509
See application file for complete search history.

(56) References Cited

U.S. PATENT DOCUMENTS

| | | | | |
|---|---|---|---|---|
| 3,062,496 | A * | 11/1962 | Stehlin | F16K 3/28 |
| | | | | 251/324 |
| 3,990,677 | A * | 11/1976 | Grenier | F16K 3/246 |
| | | | | 251/189 |
| 4,619,377 | A * | 10/1986 | Roos | F16K 3/246 |
| | | | | 222/129 |
| 6,321,948 | B1 | 11/2001 | Bellon | |
| 7,681,764 | B2 | 3/2010 | Nini | |
| 7,721,755 | B2 | 5/2010 | Smith | |
| 8,336,743 | B2 | 12/2012 | Bellmore | |
| 8,387,837 | B2 * | 3/2013 | Bellmore | B67D 3/0058 |
| | | | | 222/571 |
| 10,696,536 | B2 | 6/2020 | Nini | |
| 10,792,631 | B2 * | 10/2020 | Roberts | B01F 25/31242 |
| 2004/0135113 | A1 * | 7/2004 | Roos | B67D 3/045 |
| | | | | 251/265 |
| 2005/0104021 | A1 * | 5/2005 | Meyers | F16K 35/04 |
| | | | | 251/81 |
| 2005/0211726 | A1 * | 9/2005 | Pritchard | B67D 3/045 |
| | | | | 222/105 |
| 2006/0162785 | A1 * | 7/2006 | Smith | B65D 77/067 |
| | | | | 137/384 |
| 2022/0041426 | A1 * | 2/2022 | Nini | B67D 3/043 |
| 2022/0089428 | A1 * | 3/2022 | Edwards | F16K 3/246 |

FOREIGN PATENT DOCUMENTS

| | | |
|---|---|---|
| GB | 1381391 A | 1/1975 |
| JP | 2008207867 A | 9/2008 |
| JP | 6423992 B2 | 11/2018 |

OTHER PUBLICATIONS

European Extended Search Report dated Oct. 9, 2024; European Patent Application No. 21904217.3. 8 pages.

* cited by examiner

TWO PIECE, T-SHAPED DISPENSING TAP AND METHOD OF MAKING SAME

CROSS REFERENCE TO RELATED APPLICATIONS AND TECHNICAL FIELD

This application claims priority to U.S. provisional patent application Ser. No. 63/122,182 filed on Dec. 7, 2020, and is a national stage filing of international patent application PCT/US2021/062129 filed on Dec. 7, 2021 and claiming priority to the aforementioned provisional application. Both of applications are incorporated by reference.

This application relates generally to dispensing apparatus and, more specifically, to a two-piece tap assembly for selectively dispensing liquids through a vertical/upright tubular assembly that is attachable to a liquid filled pouch or container.

BACKGROUND

Dispensing taps are often used in combination with pouches, bags, and other fungible, replaceable, and easy-to-fill container systems. "Bag-in-box" and pouch-style liquid containers are particularly useful in the food industry because these relatively pliant and shapeable vessels can be easily placed and replaced in sturdier, prism- or cylindrically shaped containers.

The taps typically have a flange or flat member facing and/or coupled to the inner facing of the bag. In one arrangement that is used preferentially in the food service industry, a lateral/horizontally oriented flow tube connects to a cylindrical dispensing tube with valve controlling means positioned atop the dispensing tube.

U.S. Pat. No. 6,321,948 provides one example of such a tap. A twistable handle opens and closes a valve structure contained in an upright body. U.S. Pat. No. 7,721,755 shows a similar style tap, but with a pair of spiral grooves formed in a knob atop the upright body and camming projections protruding through the grooves. U.S. Pat. No. 8,336,743, as well as Japanese patent publication JP6423992B2 and European patent publication EP0272906A2, all disclose cap and upright body arrangements in which the camming interfaces are concealed beneath the tap. Notably, camming interfaces are preferred over conventional screw threads because the cam typically presents at a steeper pitch that requires less than one full revolution/turn of the cap to open or close the valve.

A different style of dispensing taps can be found in U.S. Pat. Nos. 4,619,377 and 7,681,764. Here, the flow tube extends orthogonally (i.e., horizontally) away the attachment flange so that the valve cap and valve body are all aligned along a common axis. Or stated more simplistically, whereas the previous tap style presents a T-shape, this different style is aligned in a straight line to impart an I-shape appearance. Notably, the sealing faces in an I-style shape are reduced and simplified, although persons using the tap may find the T-shape tap easier to actuate/use, especially to the extent the dispensing port in a T-shape tap is immediately identifiable (i.e., at the bottom most edge of the T-shape), whereas the location of the dispensing port is not as apparent.

Still other styles of dispensing taps having a T-shape are contemplated by international patent application WO2020/053904 and U.S. Pat. No. 10,696,536. These disclosures all show multiple elements comprising the valve cap and/or camming mechanism. This multiplicity of parts creates complexity and increases the possible modes of failure.

For the sake of clarity and to further highlight and contrast with certain aspects of the invention disclosed herein, all of the aforementioned disclosures are incorporated by reference into this Background section.

In view of the foregoing, a two-piece dispensing tap having a familiar hollow, T-shape and an easy to actuate valve integrally formed as a cap or knob would be welcome. Further, a tap is needed where the camming mechanism is concealed to minimize, if not entirely prevent, debris from accumulating within valve itself. Lastly, an ideal tap has a simple, two piece construction with a stem having a continuous, solid surface and presenting a more pleasing aesthetic that can be actuated by one full turn or less relative to the body.

SUMMARY OF INVENTION

A two piece dispensing tap, and a method of easily injection molding the same, is contemplated. The tap consists solely of a hollow tubular, T-shaped body defining a flow channel and a cap or knob (also referred to as a stem). The cap includes an outer-most skirt and a coaxial cylindrical sealing member positioned therein.

Camming protrusions on the inner and outer facings of one end of the body fit within cooperating camming grooves formed on both of the inner facing of the skirt and an outer facing of the sealing member, both of which extend down from a top closing/sealing panel formed on the cap. The skirt-facing, spherical protrusions are larger (i.e., extend radially away from the sidewall more) in comparison to the rounded, bump-like protrusions interfacing with the sealing member.

Both sets of protrusions conform to corresponding grooves formed on the cap skirt and sealing member, while seats or stopper indentations may positioned within the grooves so as to provide a tactile sensation for the open position. The pitch and positioning of the grooves on the cap also ensure the opening and closing of the valve can be achieved in less than one full turn (and as little as about one half turn) of the cap.

Lastly, the cap's outer diameter largely conforms to the upright member of the body, thereby insuring a sufficiently small footprint (relative to the diameter of the flange on the attachment end of the body) so that the body and tap are easily welded/coupled to a pouch or bag. The outer facing of the sealing cylinder of the cap and the inner facings of the body along it's upright tube (i.e., the cap-attaching end and the dispensing port end) are configured with cooperating, tapering/conical shapes and annular sealing beads to ensure fluid flows out the dispensing port when the cap is in the "up" or open position and to prevent leakage when the cap is in the "down" or closed position.

The rounded shapes of the protrusions and grooves allow the parts to be injection molded without any further machining or modification. In molding the body, a sequential ejection movement is employed so that, as the molding port/pin is pulled, the portion of the body having the protrusions will also be pulled down as the body is pushed off of the mold, thereby allowing the inner wall and outer walls to deflect over the beads and shaped grooves. Also, by forming the grooves within the cap and the corresponding protrusions directly on the body, the design is limited to only two pieces for molding, thereby simplifying molding and subsequent assembly of the tap. Thus, a method of making the dispenser tap described above is also contemplated.

Specific reference is made to the appended claims, drawings, and description, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DESCRIPTION OF THE DRAWINGS

Operation of the invention may be better understood by reference to the detailed description taken in connection with the following illustrations. These appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure. Notably, the number and relative positioning of specific components in the Drawings (e.g., three sealing beads in FIG. 6, two inner and outer facing camming protrusions in FIG. 2E, the positioning of the dispensing port and tapering cone leading to the dispensing port beneath the fluid flow passage in FIG. 3E) should all be treated as part of this written description.

FIG. 2A is a cross sectional, side, perspective view taken along line A-A in FIG. 1, while

FIG. 3A is a side view of the valve body component in isolation as shown in FIG. 1, while FIG. 3C is a front view of the same valve body component in isolation, while

DETAILED DESCRIPTION OF EMBODIMENTS

Figure 1:
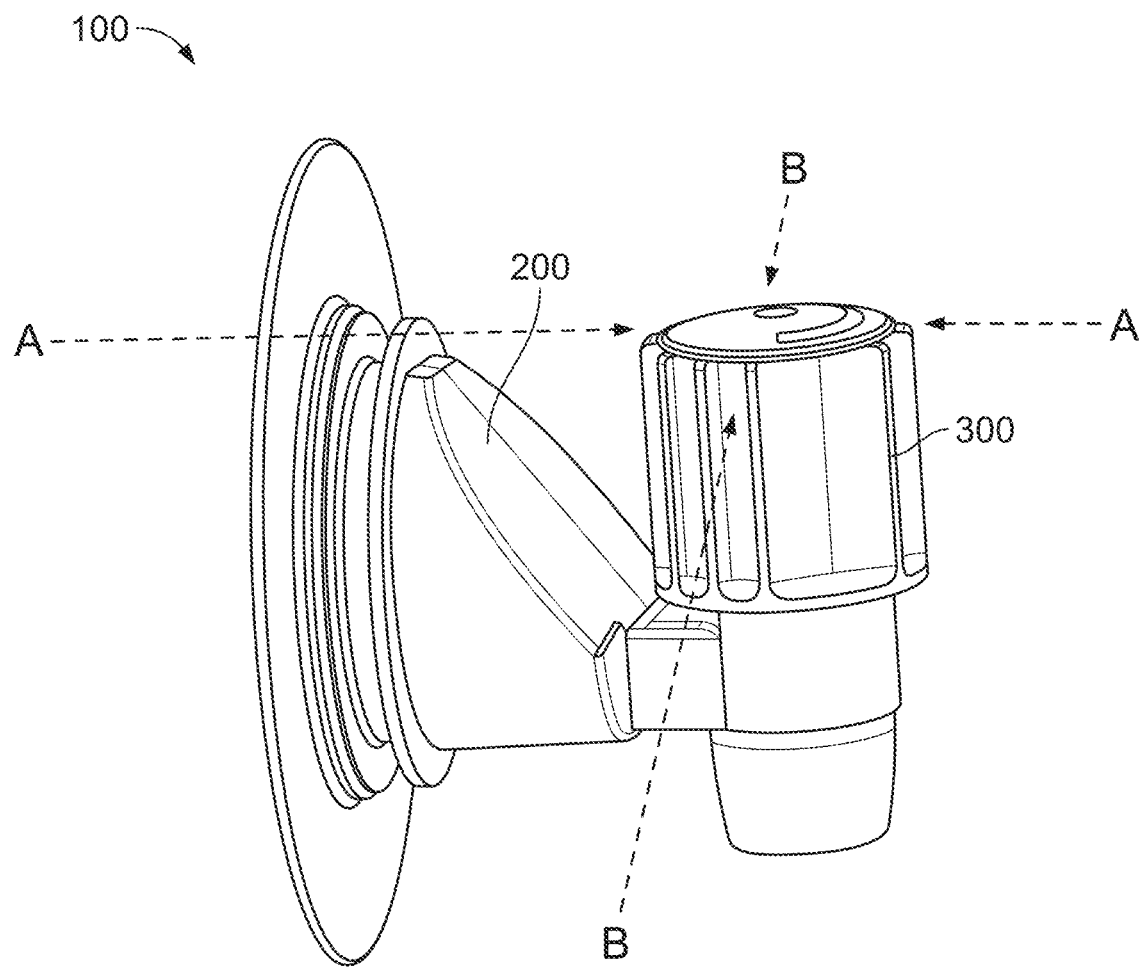
FIG. 1 is a three dimensional, elevated, perspective view of a dispensing apparatus according to various aspects disclosed herein.
Figure 2A:
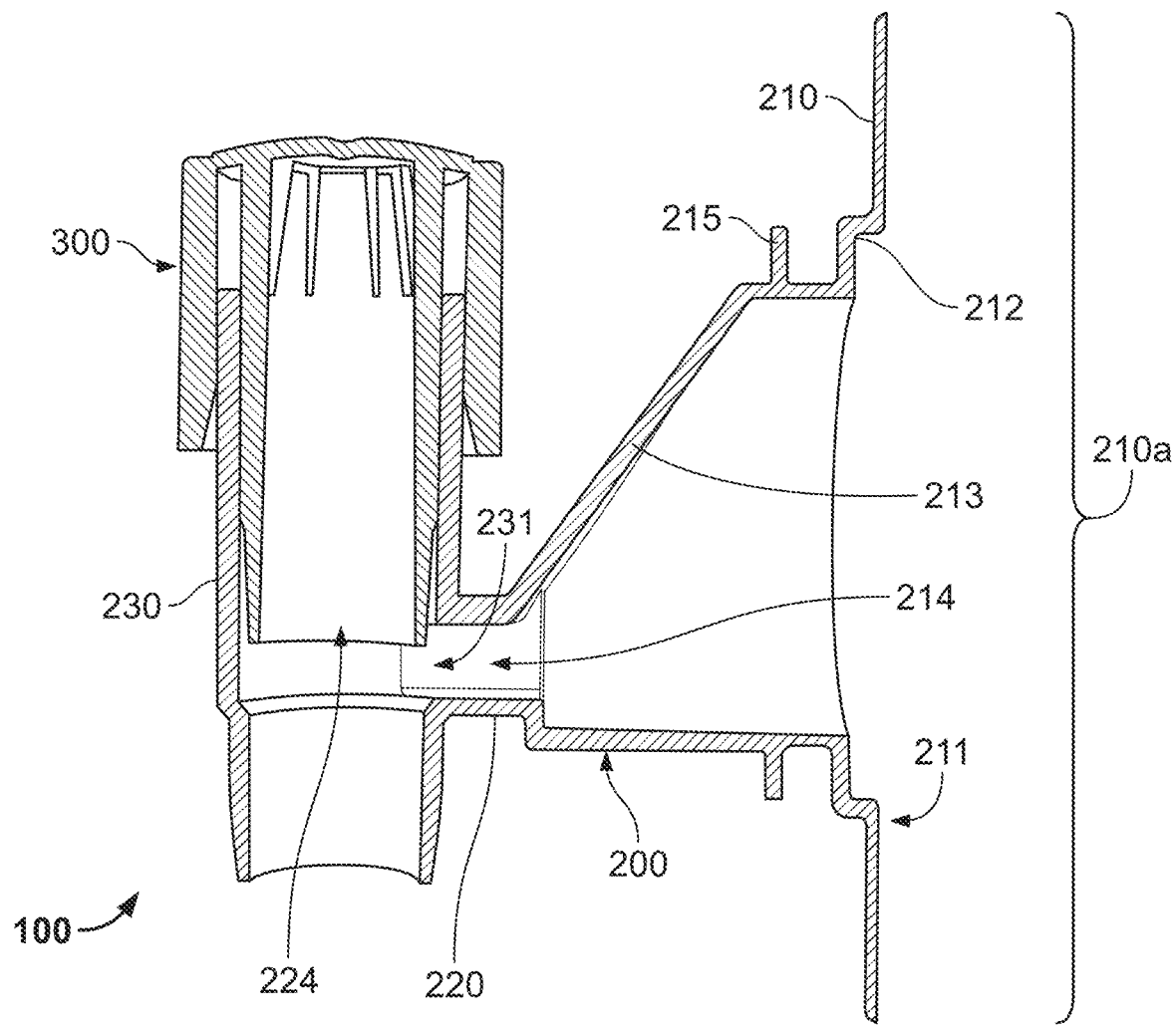
Figure 2B:
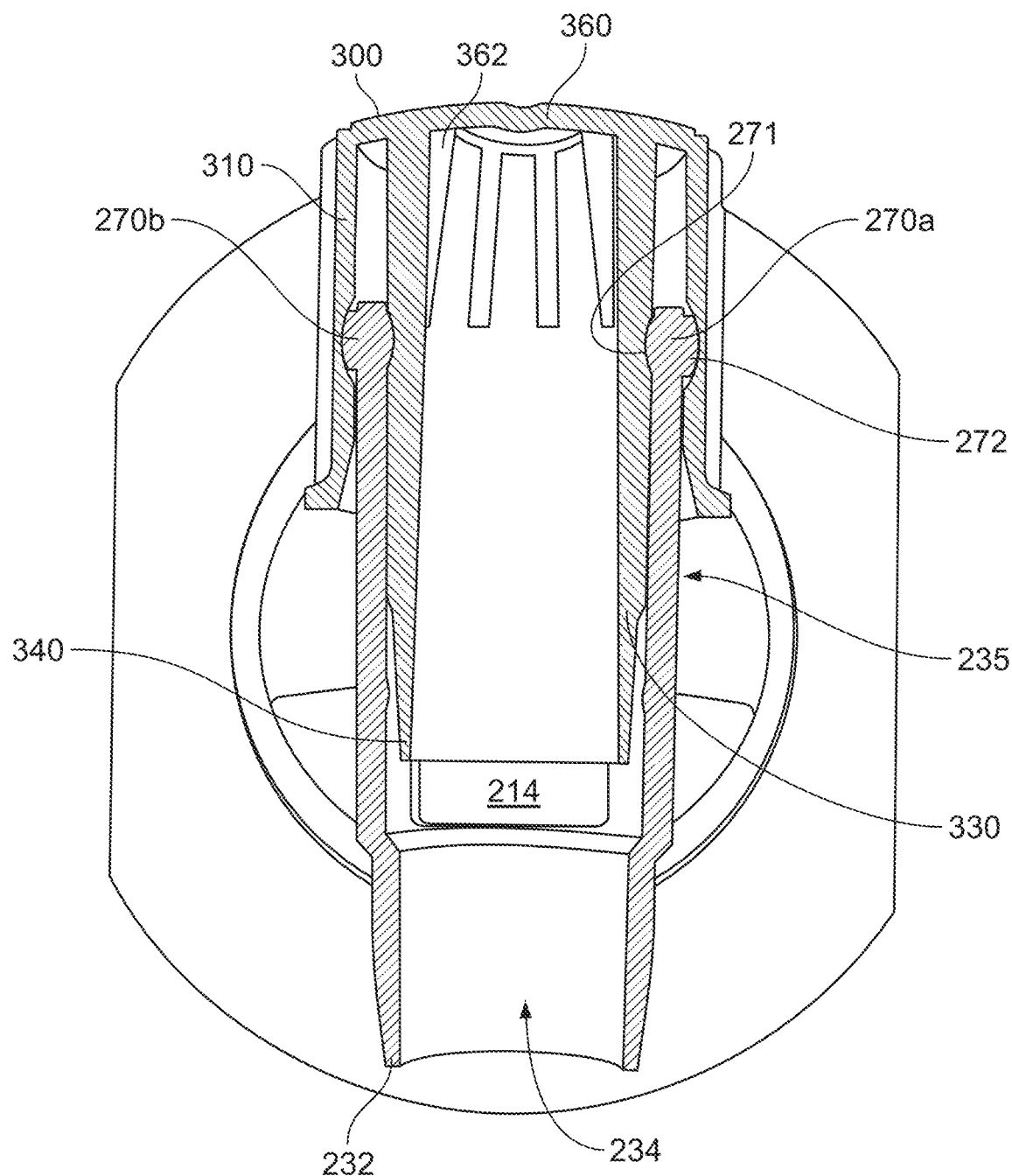
FIG. 2B is a cross sectional, front, perspective view taken along line B-B in FIG. 1.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Food service dispensing taps is a well established and highly competitive market segment. These products are used in restaurants, caterings services, and special events, all of which prioritize low cost, simplicity of use, and (increasingly of late) sustainability. Thus, suppliers have devoted considerable effort toward developing unique products, as evidenced by the various patents noted in the Background section above.

Upright, T-shaped dispensing taps with cam-actuated valves are of particular interest. These taps are preferred owing to their familiarity and ease of use, particularly in comparison to I-shaped and/or conventional screw threaded taps and valves. One of the most notable distinguishing features of T-shaped taps is the T-shaped, hollow tubular body where the horizontally disposed end attaches to the liquid container (usually a flexible bag or pouch), and the remaining end is an upright hollow member. The dispensing port is positioned at the lower/bottom end of that upright member so that fluid flows through the horizontal section and out the dispensing port, while a valve control is provided on the top end.

Turning now to FIGS. 1 through 5B, an improved, two piece, T-shaped dispensing tap 100 is disclosed. Tap 100 is formed of only two independent components: body 200 and cap or knob 300. The significance of having two independent components is that the tap 100 may first be easily welded or attached to a flexible liner, pouch, bag, or container, after which the cap 300 may be snapped onto the body 200.

Body 200 is formed from a hollow cylindrical tubular material, preferably injection molded to allow for high volume production at the lowest possible cost. Other similar methods of manufacture could also be employed. As discussed throughout, lines A-A and B-B shown in FIG. 1 define and lie within the "horizontal plane" of the tap 100, with "vertical" orientations falling within any plane that lies orthogonal to that horizontal plane. Notably, this horizontal plane is also orthogonally aligned relative to the central axis defined by upright tubular section 230.

Body 200 has an attachment flange 210 at one end. Flange 210 provides a flattened base 211 for coupling, while one or more series of steps 212 and/or funnels 213 define a narrowing fluid flow passage 214. Additional flanges or formations 215 may be provided proximate flange 210 to further facilitate coupling the tap 100 to whatever appropriate liquid-carrying vessel may be required. Throughout these formations 210, 211, 212, 213, 215 the thickness of the wall may be constant or varied, depending upon the nature of the materials and manufacturing methods employed. Also, these sections will be tubular (i.e., a hollow cylinder) and, in some cases, sloped or conical, with a cross section taken in the vertical plane. While the base 211 is shown as having a circular shape owing to advantages in the process of coupling such shapes to liners, etc., other shapes (oval, curved, polygonal, curvilinear, etc.) may be used in other aspects.

Notably, the length of the outer-most diameter 210a of flange 210 should exceed the length of any other component or part of tap 100. Stated differently, diameter 210a is greater than the length or width of both body 200 and cap 300. In one aspect, diameter 210a is greater than the length and width of both body 200 and cap 300 when these components are assembled (irrespective of whether cap is in the up/open position or the down/closed position).

The inner surfaces of the tubular section comprising flange 210 connect to horizontal member 220. Horizontal member 220 defines the flow channel 224, which is connected to flow passage 214. As shown, member 220 is a polygonal shaped tube, although other shapes are possible. Preferably, the flow capacity (i.e., the volume of liquid capable passing therethrough over a predetermined period of time) within member 220/channel 224 is equal to or less than the flow capacity of the flange 210/passage 214. As with flange 210, the thickness of the sidewalls defining member 220 may be the same or different, both in comparison to one another and/or along the length of the channel 224.

Upright tubular member 230 includes an inlet 231 to fluidically connect flow channel 224 to dispensing channel 234. Inlet 231 is positioned axially above the dispensing port 232 but beneath the top opening 233. Generally speaking, and subject to the further features described below, member 230 is tapered so that at least the inner diameter, and preferably the outer diameter, of the port 232 is less than the inner diameter of the top opening 233. Excepting for beads 250, 260 and frusto-conical ledge 240, this taper is regular and linear in nature (i.e., does not entail any significant curved sections. The wall thickness of member 230 may be comparatively smaller beneath the inlet 231 relative to its thickness above the inlet 230. In one aspect, the thickness of the wall in member 230 above the inlet 231 is substantially constant so as to allow for reliable operation of camming protrusions 270 with camming surfaces 370.

Bevel or cone 234 may be formed at the inner facing of the top opening 233 to facilitate coupling and sealing engagement with the cap 300. Immediately beneath but still axially offset beneath the point where 234 meets the inner facing of the member 230, camming protrusions 270 extend radially inward and outward from the top wall section 235.

Preferably, there are a plurality of protrusions 270 spaced apart at regular intervals so as to align and cooperate with the surfaces 370 provided on cap 300. As shown and in a preferred embodiment, two sets of protrusions 270a, 270b are provided. The features indicated below for a single protrusion 270 are applicable to any protrusions that may be provided. Also, it is important to note that no other protruding features can be provided on either facing of wall 235, as any additional features may interfere with the smooth and intended operation of the valve mechanism.

Each protrusion 270 includes an inner facing 271 and an outer facing 272. The radial extension or reach of facing 271 is shorter than that of facing 272. Further, the shape of facing 271 is preferably of a rounded button or bump, whereas facing 272 presents as a more defined, raised cylinder. The vertical facings 271a, 272a should be spherical or rounded in nature so as to cooperate with and move smoothly along and within surface 370. Further, these rounded facings 271a, 272a facilitate ejection of the body 200 from its manufacturing mold, as well as allow for easier assembly of the cap 300 onto and into the upright member 230.

Axial offset beneath protrusions 270 but above the inlet 231, a series of sealing beads 250, 260 are provided. Each of beads 250, 260 form separate, complete raised annuls along the inner facing of the member 230. In a preferred arrangement, beads 250, 260 are circularly aligned within separate horizontal planes. The inner diameter of lower bead 250 is smaller than that of the upper bead 260. Further, a tangent T can be drawn between the top edges of beads 250, 260 in a manner that matches the taper of the inner surfaces of the member 230 from the top opening 233 all the was to the beginning of the ledge 240.

Particularly with respect to lower bead 250, the purpose of beads 250, 260 is to sealingly but slidingly engage the surface of the cylindrical member 330 of cap 300. Thus, each bead 250, 260 will be appreciably raised and distinguishable from the smooth, tapered sidewall on either side of it; however, its profile will still be conducive to allowing the member 330 to glide across/over it. In this manner, fluid flowing along the path established by 214, 224, 234 will not inadvertently leak out of the top opening 233.

Figure 3A:
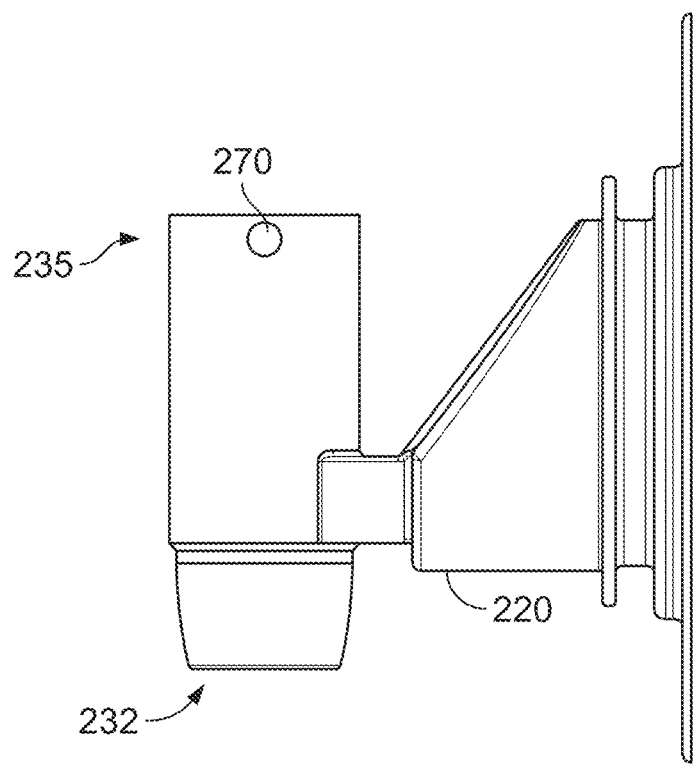
Figure 3B:
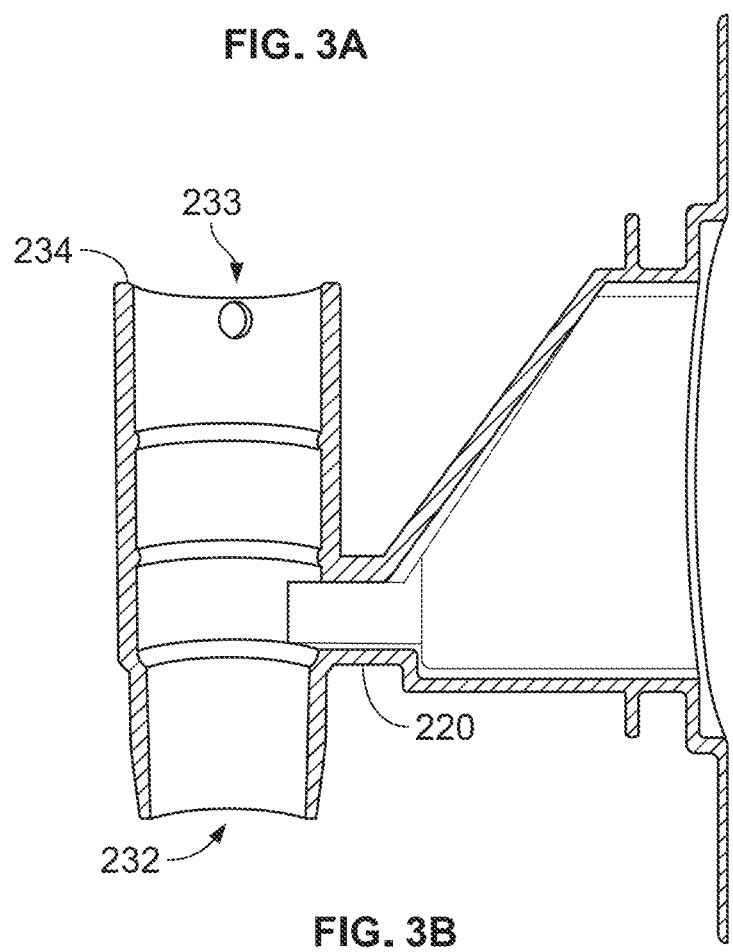
FIG. 3B is a similar cross sectional perspective view, with the cross section taken along the central diameter of the upright tube of that same valve component.
Figure 3C:
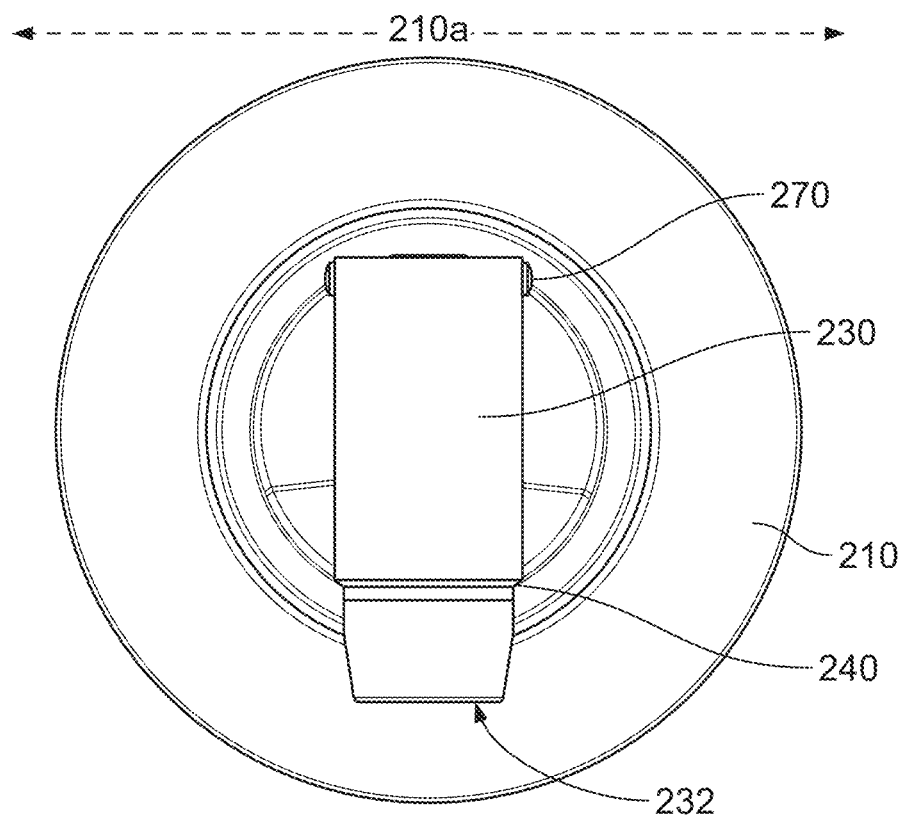
Figure 3D:
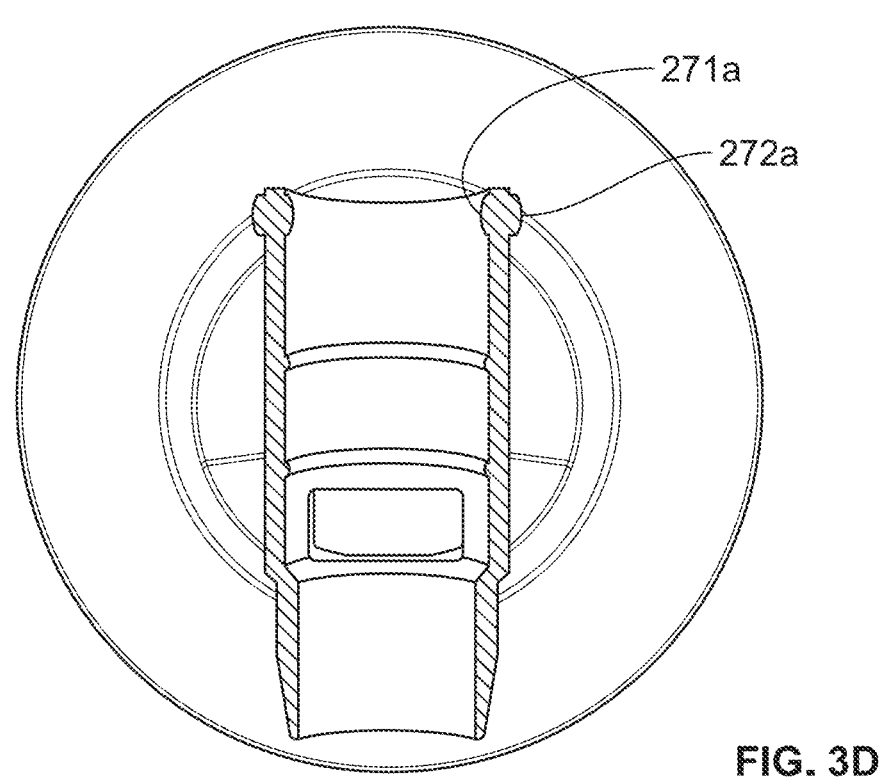
FIG. 3D is a cross sectional perspective view taken along the central diameter of the upright tube.
Figure 3E:
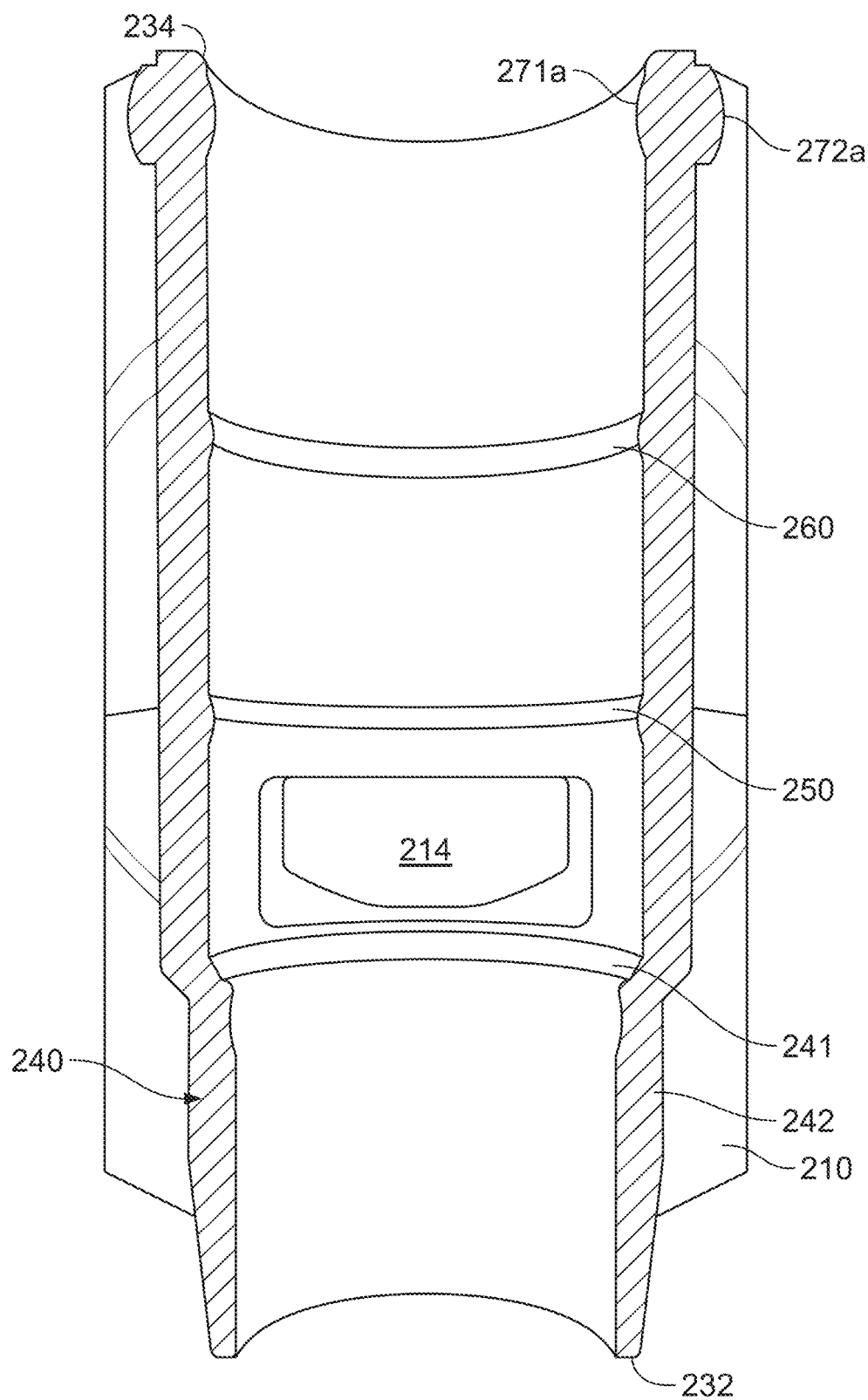
FIG. 3E is an enlarged, sectional view of FIG. 3D highlighting the surface features imparted on the inner and outer facings thereof.
Figure 4A:
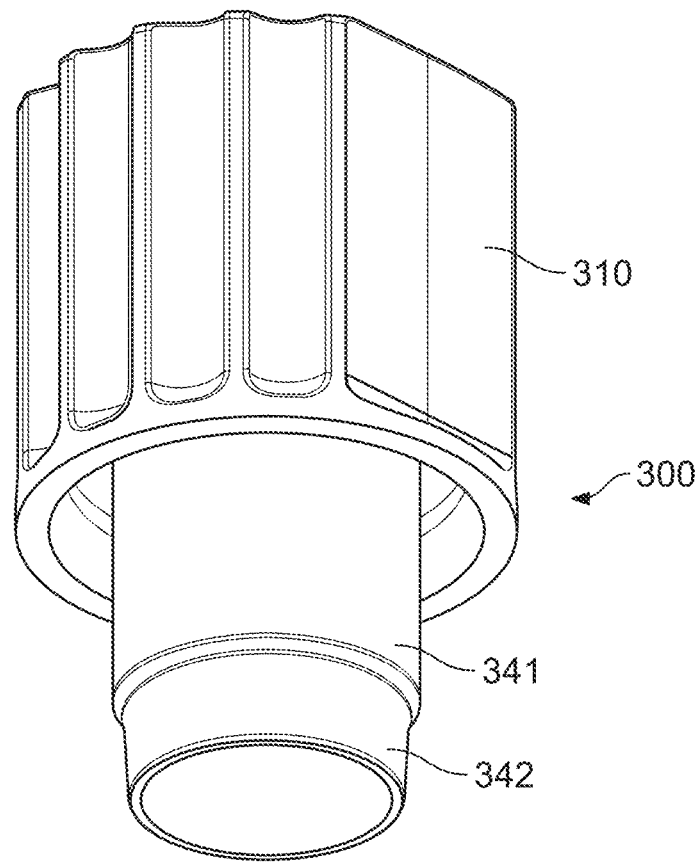
FIG. 4A is a perspective side view of the valve cap or stem component isolation as shown in FIG. 1.
Figure 4B:
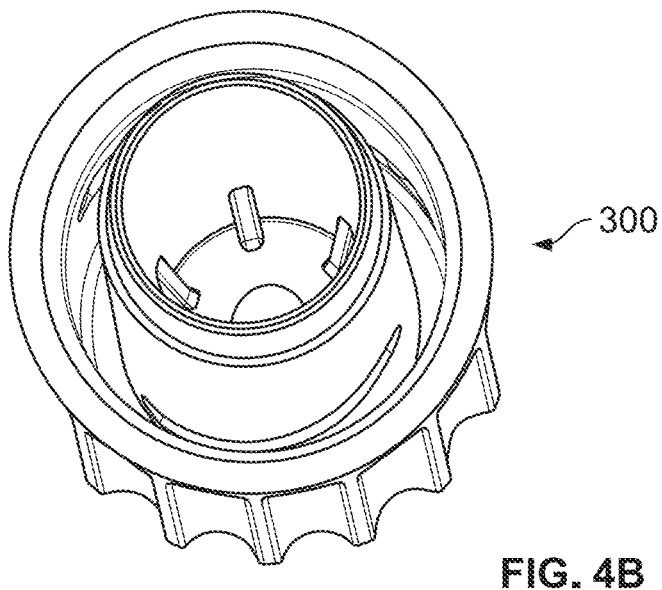
FIG. 4B is an opposing/complimentary perspective bottom view of that same component highlighting features along the inner-most surface thereof.
Figure 4C:
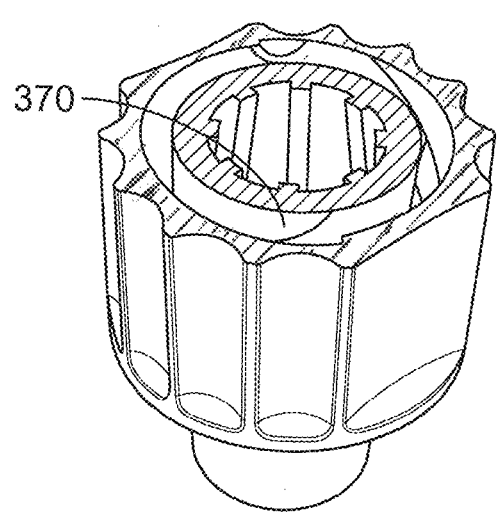
FIG. 4C is a cross sectional view perspective taken along a horizontal plane defined by line C-C in FIG. 4E (i.e., immediately beneath the top panel and adjacent to the camming threads found on the valve cap component shown in FIG. 4A).
Figure 4D:
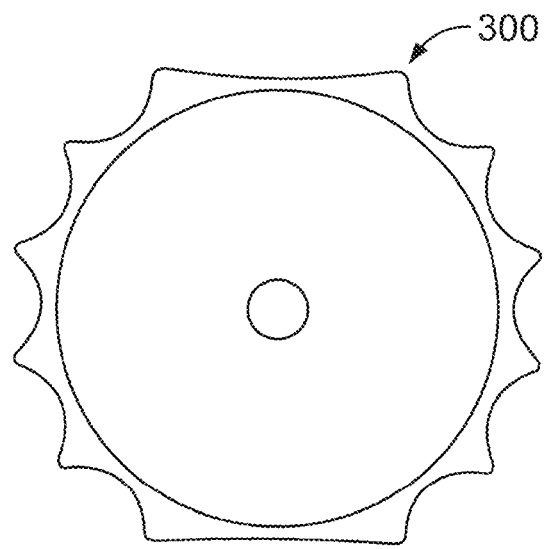
FIG. 4D is a top plan view and FIG. 4E is a cross sectional perspective view taken along the central diameter of the valve cap component shown in FIG. 4A.
Figure 4E:
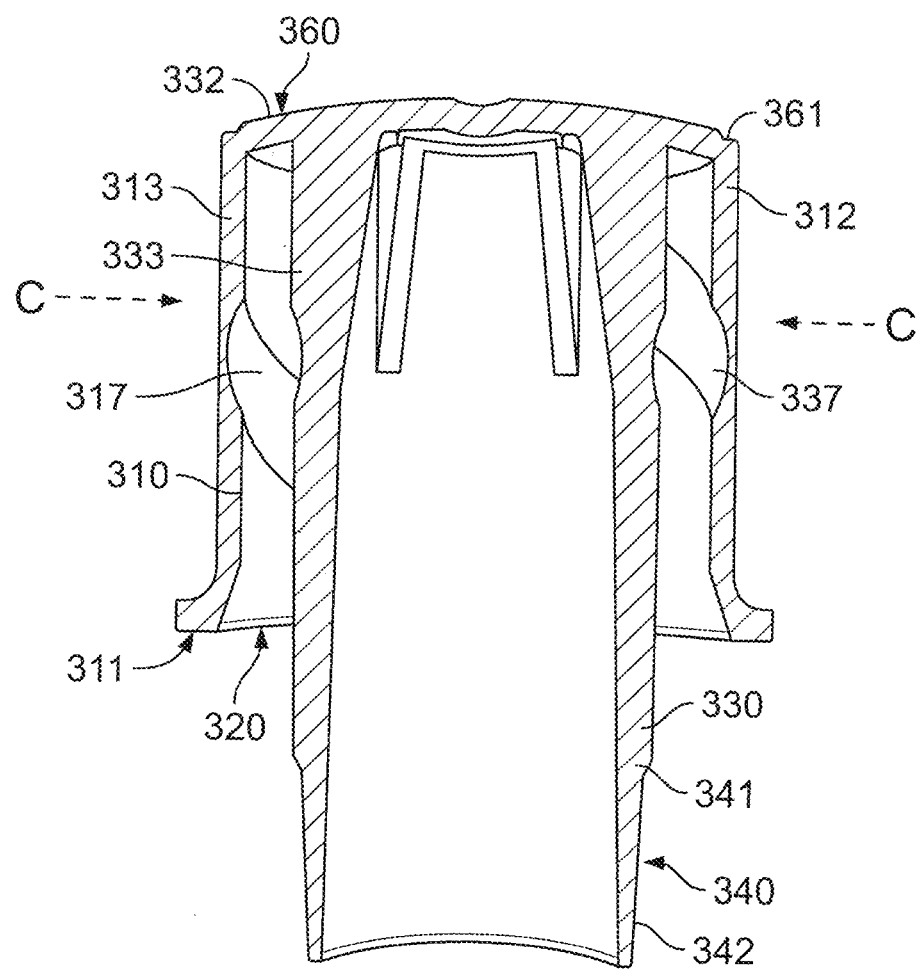
Figure 5A:
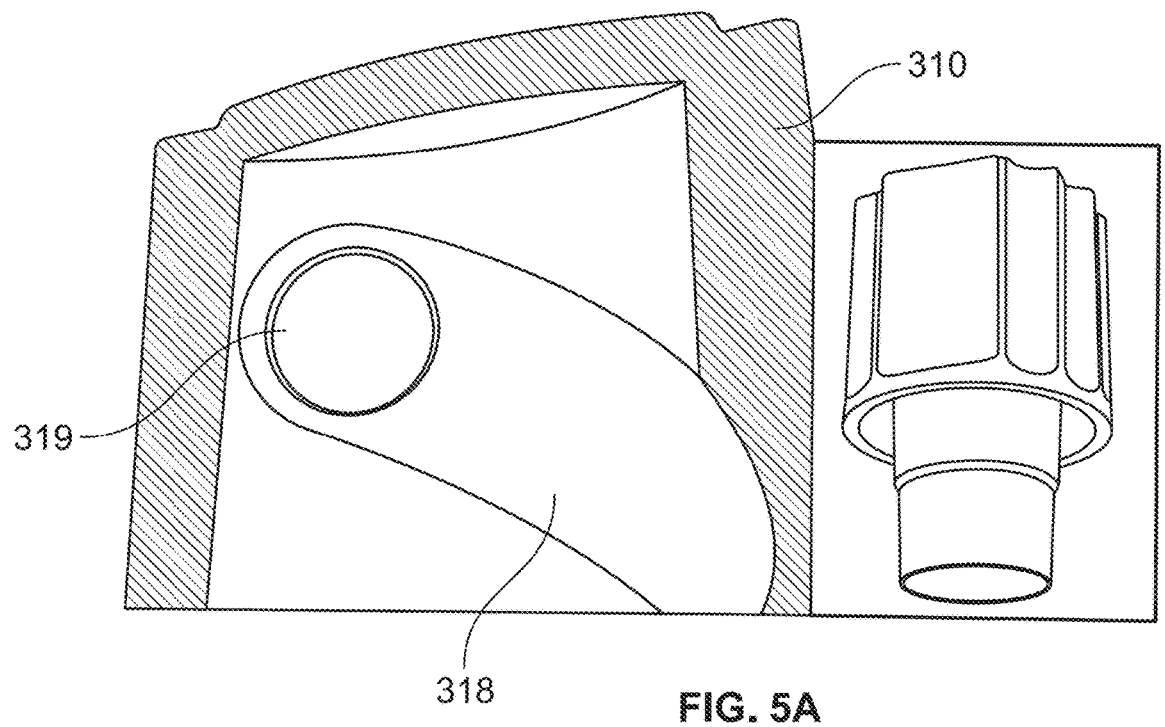
FIG. 5A is an angled and partial cross sectional view of the cap valve cap of FIG. 4A in isolation, highlighting the camming thread on the inner facing of the skirt, with the view generally taken along the plane defined by line F-F of the three dimensional inset.
Figure 5B:
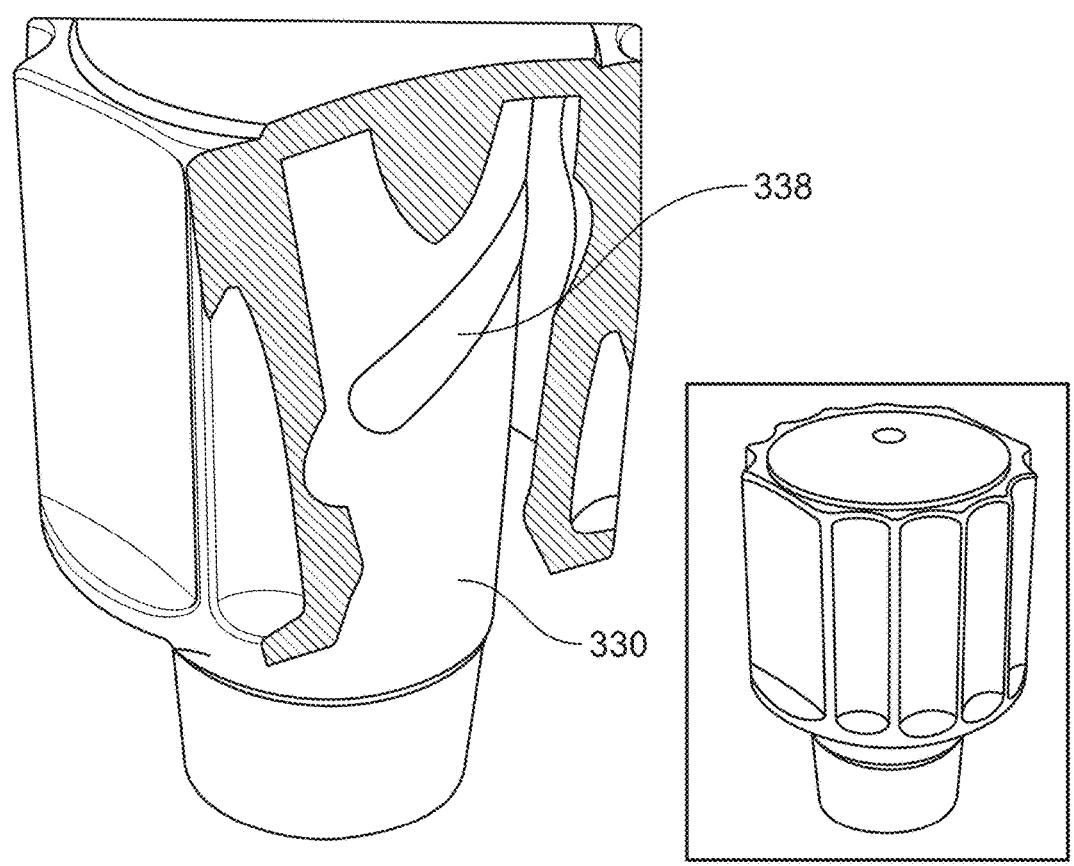
FIG. 5B is an angled and partial cross sectional view of the cap valve cap of FIG. 4A in isolation, highlighting the camming thread on the outer facing of the skirt and the comparative axial positioning of the sealing beads provided on the body (as shown in FIG. 3E), with the view generally taken along the plane defined by line G-G of the three dimensional inset.
Figure 6:
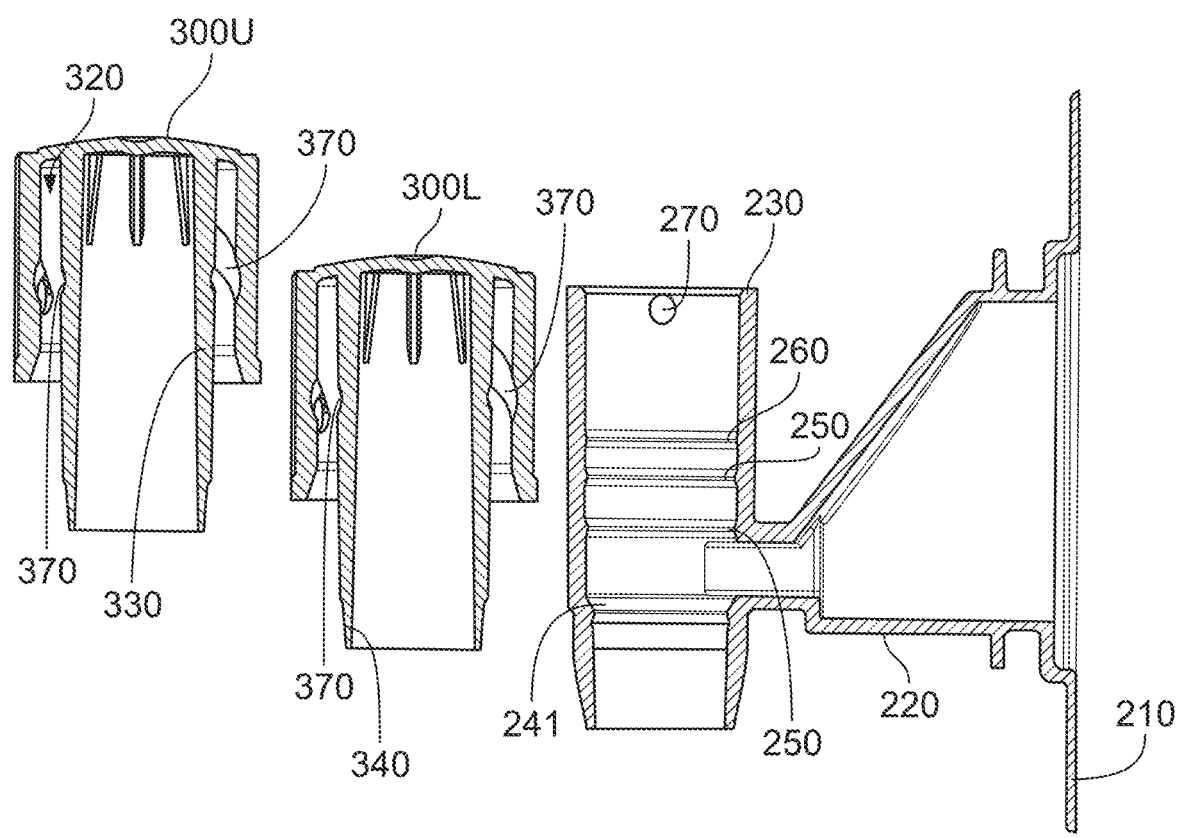
FIG. 6 is an exploded, cross sectional, side, perspective view, drawn to scale and taken along line A-A in FIG. 1, with separate iterations indicating the upper-most (300U) and lower-most (300L) positioning of the cap or knob relative to the body. This view also illustrates an alternative positioning for the surface features in comparison to those shown in FIG. 3E.

Another aspect of the sealing beads 250, 260 can be discerned by comparing FIGS. 3E and 6. In the former, upper sealing bead 260 is positioned to retain a sealing surface against the knob 300, whereas a plurality (two or more) axially offset lower sealing beads 250 are provided in the latter. In FIG. 6, the upper sealing bead 260 is also repositioned axially so that its sealing circumference remains beneath the position of the grooves 370, thereby insuring that the body 200 and cap 300 remain sealed at all times during the twisting the cap 300 relative to the body 200 (i.e., actuation to open and close the valve).

Immediately beneath inlet 231, the profile of the inner surface of member 230 constricts appreciably. That is, a ledge or differently sloped, conical section 240 serves as an axial stop that cooperates with section 340 on the member 330. The bottom-most edge 241 of the section 240 also sealingly engages ramp 341 when the cap 300 is the closed/down position so as to prevent unwanted leakage or loss of fluid through the tap 100 and, more specifically, by way of path 214, 224, 234 and out port 232. Thus, the inner diameter of the tube 230 within section 240 gradually reduces at a steeper slope/angle than the normal taper of that tube 230. At its narrowest point (i.e., proximate the sealing surface 241), the inner diameter of section 240 is smaller than the corresponding inner diameters of either bead 250, 260.

The lower wall section 242 runs from the bottom edge of the cone section 240 to the terminal edge at port 232. The wall thickness in this section is preferably reduced as it approaches the edge at port 232 (i.e., it is thicker closer to the inlet 231 and thinner at the port 232). Section 242 is also tapered, again preferably at an angle that is different and steeper than the taper along section 235 but less than that of the cone section 240.

As noted above, the overall purpose of the ever-narrowing inner diameter along upright member 230 (i.e. from top opening 233 to port 232) is to ensure member 230 engages cap 300 and, more specifically, cylinder 330. To that end, cylinder 330 should have sufficient pliability and resilience to maintain a sealing fit with at least one of beads 250, 260 at all times (i.e., whether in the open or closed position). The increased taper in section 242 could also serve to form a plug seal with the lower facings 342 in section 340.

Cap 300 is formed as a discrete element in comparison to body 200. Cap 300 presents as an outer-most annular skirt 310 with a coaxially aligned sealing cylinder 330 set within and extending down axially further than the bottom edge 311 of skirt. Skirt 310 and cylinder 330 are connected by a panel 360, with at least the outer most periphery 361 of panel 360 connecting the top edge 312 of the skirt 310 to the top end 332 of the cylinder 330. Notably, the sidewall 313 of skirt 310 and sidewall 333 of the cylinder 330 are in a substantially parallel arrangement to define a radial gap 320.

Gap 320 is sized and configured to receive the thickness of wall section 235, while also allowing the cap 300 to rotate freely about the upright member 230. Specifically, at least along the sections where caroming surfaces 370 are provided, gap 320 should define a substantially constant and/or non-varying distance between skirt 310 and cylinder 330. Proximate to end 311, the gap 320 may flare outward so as to increase in distance, as this should facilitate coupling the cap 300 to the upright member 230.

Panel 360 is formed primarily in the horizontal plane, although it may be imparted with a raised or round appearance. Also, panel 360 may present as a substantial flat outer surface so as to enable forming indicia relating to operation, contents, and/or the source of origin for the tap 100 and/or the fluid being dispensed thereby. Notably, the inner surfaces of cylinder 330 need not be joined at the top end 332 and, either alternatively or additionally, these sidewalls 333 could be joined at lower position. It may also be possible to form panel 360 as an annular ring so that this hollowed inner portion of the cylinder 330 is accessible, possibly for cleaning or aesthetic purposes.

When top panel 360 continuously encloses the inner portion of cylinder 330, a plurality of support ribs 362 may be formed along the inner surface of wall 333. Ribs 362 provide sufficient strength to ensure cap 300 can withstand rotational forces and, more generally, serve its intended purpose as a sealing element.

Conversely, the lower portion 340 of cylinder 330 includes a ramp section 341 and, in comparison to wall 333, a thinner, more flexible, and resilient wall section 342. The outer diameter of section 342 may taper inward (i.e., decrease) so as to cooperate with the shape/taper of section 242. More generally, the lower extremities of cylinder 330, including but not limited to section 342, can temporarily flex or constrict inward in response to the sealing faces and/or beads formed on the inner surfaces of member 230.

As noted above, camming surfaces 370 are formed along arcuate sections of opposing surfaces on skirt 310 and cylinder 330. In particular, camming surface 317 is formed on an inner facing of skirt 310, while camming surface 337 is formed on an outer facing of cylinder 330. In both instances, surfaces 317, 337 are proximate one another so as to receive and cooperate with protrusions 270 noted above.

Surfaces 370 are formed as spiral grooves 318, 338. The pitch of these grooves are similar and sufficient, when considered in combination with their length, to allow the cap 300 to rotatably travel in an axial distance that blocks or opens inlet 231. Thus, in the down position, sealing faces 241, 341 are engaged so as to close off inlet 231 and prevent liquid from being drawn (via gravity) from path section 224 into channel 234. In the up position, inlet 231 is unobstructed so that liquid may flow freely through channel 234 and out of dispensing port 233.

The depth and shape/profile of grooves 317, 337 will cooperate with the radial extension of the protrusions 270 so as to define a traveling path as the cap 300 is rotated relative to body 200. At the open and/or closed positions (which roughly correspond to points at or near the top and bottom edges of the grooves 317, 337), a seat 319 can be formed as a further indent. The shape of seat 319 matches the vertical presentation of the protrusion 270 so as to provide a natural fit and resting place, and such seats 319 may be at the upper and/or lower positions of the grooves 370. In operation, this provides the user with a tactile sensation of where the open and closed positions reside within tap 100. The use of opposing sets of protrusion-and-groove combinations also ensures that rotation of the cap has a smooth sensation, with the seats providing a tactile, and possibly even audible, sensation so that the user knows when the open position has been reached. Further, by relying upon circular protrusions 270 and corresponding grooves 370 in combination with a plurality of opposing camming surfaces 317, 337, the cap 300 can be guided along its spiraling path easily and without risk of decoupling.

The pitch of the grooves 317, 337 can be measured relative to the circumference of the circular surface on which they reside. To that end, grooves 317, 337 travel radially less than one full turn (i.e., less than 360° around that circumference) and, more preferably, their arc is great than about 45° but less than 180° (and, still even more preferably, between 75° and 135°, with about 90° for two grooves disposed on opposing facings of the skirt and sealing cylinder being most preferred). Relative to the axial height, the grooves 317, 337 will encompass an axial height that is less than the corresponding flat surfaces of the sidewall 313 of skirt 310 (i.e., from above end 311 to top 312) and the sidewall 333 of cylinder 330 (i.e. from above ramp section 341 to top 332) on which they are formed, with the grooves covering at least 50%, between 60% and 90%, and most preferably about two thirds to three quarters of these respective surfaces. The grooves and protrusions may have cooperating spherical profiles to facilitate their sliding movement and seating/coupling.

The number and location of protrusions 270 should match the number of camming surfaces 370. While a pair of protrusions and surfaces are illustrated and believed to represent the most desirable balance of operational and manufacturing ease, it will be understood that one or a plurality of these features may be provided. Also, while protrusions 270*a*, 270*b* are shown to be at the same axial elevation, they do not necessarily need to be provided as such. If less than two protrusions are used, it may denigrate the preferred smooth motion and tactile sensation of seating the protrusion, while three or more protrusions may limit the variety of injection molding materials that can be used and require a more aggressive geometry (in terms of pitch, positioning, etc.) to produce the desired characteristics for operating (i.e., opening and closing) the tap.

On the outer surface of skirt 310, ribs, knurling, and/or flattened faces may be formed. These formations will enhance a user's ability to grip and twist the cap, while also providing an indication of how far the cap has been (or needs to be) rotated.

The structures described above are comparatively easy to mold, manufacture, and assemble, particularly in comparison to the more complex designs noted in the Background section above. The shape and positioning of the protrusions 270 are particularly amenable to sequential ejection from a molding dye. Also, the configuration and coupling of cap 300 to body 200 should allow for natural fit and alignment.

Separately, the final, assemble tap 100 does not include any open grooves or other areas where dirt or mold can accumulate as the tap 100 is used. Further, by concealing the camming action, it reduces the possibility of having an obstruction impede rotation and operation of the cap 300. Thus, the skirt 310 of the cap 300 presents as a continuous solid surface extending down from the top panel 360, thereby completely concealing the camming protrusions 270 and camming grooves 370 irrespective of their rotational/axial positioning (i.e., at an upper, open configuration or a lower, closed configuration).

In addition to the foregoing description, aspects of the invention may include a dispensing tap having any combination of the following features: a hollow tubular body having a T-shape with a narrowing funnel portion defining an container attachment end, a tapering sidewall defining a dispensing port end, an upper sidewall defining a cap-receiving end, and a flow channel fluidically connecting the container attachment end to the cap-receiving end and the dispensing port end and wherein: (i) an outer facing of the upper sidewall is provided with at least one radially extending camming protrusion, (ii) an inner facing of the upper sidewall is provided with at least one annular sealing bead and at least one radially extending camming protrusion, and (iii) an inner facing of the tapering sidewall is provided with an annular sealing bead; a cap, fitted over the cap-receiving end, having an skirt coaxially fitted around an sealing cylinder and a top panel connected to top terminal edges of the skirt and the sealing cylinder and wherein: (a) at least one camming groove spirals axially along each of an inner facing of the skirt and an outer facing of the sealing cylinder, (b) a bottom terminal edge of the sealing cylinder extends axially beyond a bottom terminal edge of the skirt, and (c) the upper sidewall of the body is received in a gap formed between the skirt and the sealing cylinder; wherein at least one of the radially extending camming protrusions has a circular, spherical shape; wherein all of the camming protrusions provided on outer facing of the upper sidewall are larger than the camming protrusion(s) provided on the inner facing of the upper sidewall; wherein a plurality of annular sealing beads are axially offset along the inner facing of the upper sidewall; wherein the annular sealing bead of the upper sidewall is positioned to remain axially beneath the camming grooves irrespective of the positioning of the camming protrusions within the camming grooves; wherein at least one of the camming grooves is provided with a seat; wherein the sealing cylinder includes a tapered lower section that conforms to the tapering sidewall when the cap is rotated to a closed position; wherein a conical section constricts radially inward beneath the annular sealing bead provided on the tapering sidewall; wherein the camming protrusion on the outer facing is formed adjacent and opposite to the camming protrusion on the inner facing; wherein two camming protrusions are equally spaced apart along a circumference on the inner and outer facings of the upper sidewall; wherein all of the camming grooves are configured to position the cap in an open or closed position at less than one full rotation of the cap relative to the body; wherein a radial attachment flange is provided at the container attachment end; wherein a sealing bevel is provided at a terminal end of the upper sidewall; and wherein the camming protrusions and the camming grooves are concealed in the gap of the cap.

References to coupling, connection, or attachment in this disclosure are to be understood as encompassing any of the conventional means used in this field. This may take the form of snap- or force fitting of components having tabs, grooves, and the like. Nevertheless, threaded connections, annular or partial bead-and-groove arrangements, cooperating cam members, and slot-and-flange assemblies could be employed. Adhesive and fasteners could also be used, although such components must be judiciously selected so as to retain the recyclable nature of the assembly.

In the same manner, engagement may involve coupling or an abutting relationship. These terms, as well as any implicit or explicit reference to coupling, will should be considered in the context in which it is used, and any perceived ambiguity can potentially be resolved by referring to the drawings.

All components should be made of materials having sufficient flexibility and structural integrity, as well as a chemically inert nature. The materials should also be selected for workability, cost, and weight. Common polymers amenable to injection molding, extrusion, or other common forming processes are useful, although a single grade is preferred. As such, polypropylene is expected to have particular utility.

In fact, another reason consumers, manufacturers, and others will find utility in these designs/components is precisely because of the use of only a single grade of polymer (e.g., polypropylene). This approach should simplify both manufacturing and recycling of the dispenser apparatus. Other materials—and particularly recyclable, injection molding materials—may be useful, including without limitation polyethylene (including low density and other grades), polystyrene (including high impact and other grades), acrylonitrile butadiene styrene, and polyacetals (including polyoxymethylene, polyacetal, polyformaldehyde, and other grades).

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

What is claimed is:

1. A dispensing tap comprising:
   a hollow tubular body having a T-shape with a narrowing funnel portion defining a container attachment end, a tapering sidewall defining a dispensing port end, an upper sidewall defining a cap-receiving end, and a flow channel fluidically connecting the container attachment end to the cap-receiving end and the dispensing port end and wherein: (i) an outer facing of the upper sidewall is provided with at least one radially extending outer camming protrusion, (ii) an inner facing of the upper sidewall is provided with at least one annular sealing bead and at least one radially extending inner camming protrusion, and (iii) an inner facing of the tapering sidewall is provided with an annular outlet sealing bead, wherein the outer camming protrusion on the outer facing is formed adjacent and opposite to the inner camming protrusion on the inner facing; and
   a cap having an skirt coaxially fitted around an sealing cylinder and a top panel connected to top terminal edges of the skirt and the sealing cylinder and wherein:
   (a) at least one camming groove spirals axially along each of an inner facing of the skirt and an outer facing of the sealing cylinder, (b) a bottom terminal edge of the sealing cylinder extends axially beyond a bottom terminal edge of the skirt, and (c) when the cap is fitted over the upper sidewall of the body, the cap-receiving end of the upper sidewall is positioned in a gap formed between the skirt and the sealing cylinder, and the inner and outer camming protrusions are received in the at least one camming groove.

2. The dispensing tap of claim 1 wherein all of the radially extending camming protrusions has a spherical shape conforming to a shape of each camming groove associated therewith.

3. The dispensing tap of claim 1 wherein each of the outer camming protrusions provided on outer facing of the upper sidewall are larger than the inner camming protrusion(s) provided on the inner facing of the upper sidewall.

4. The dispensing tap of claim 1 wherein a plurality of annular sealing beads are axially offset along the inner facing of the upper sidewall.

5. The dispensing tap of claim 1 wherein the annular sealing bead(s) of the upper sidewall is positioned to remain axially beneath the camming grooves irrespective of the positioning of the camming protrusions within the camming grooves.

6. The dispensing tap of claim 1 wherein at least one of the camming grooves is provided with a seat denoting an open and/or closed position for the dispensing tap.

7. The dispensing tap of claim 1 wherein the sealing cylinder includes a tapered lower section that conforms to the tapering sidewall when the cap is rotated to a closed position.

8. The dispensing tap of claim 1 wherein a conical section constricts radially inward beneath the annular sealing bead on the tapering sidewall.

9. The dispensing tap of claim 1 wherein a second outer camming protrusion and a second inner camming protrusions are equally spaced apart along a circumference on the inner and outer facings of the upper sidewall.

10. The dispensing tap of claim 1 wherein all of the camming grooves are configured to position the cap in an open or closed position at less than one full rotation of the cap relative to the body.

11. The dispensing tap of claim 1 wherein a radial attachment flange is provided at the container attachment end.

12. The dispensing tap of claim 1 wherein a sealing bevel is provided at a terminal end of the upper sidewall.

13. The dispensing tap of claim 1 wherein the inner and outer camming protrusions and the at least one camming groove are concealed in the gap of the cap.

* * * * *